United States Patent [19]

Unruh

[11] Patent Number: 5,706,907
[45] Date of Patent: Jan. 13, 1998

[54] DUAL LEVER CLUTCH ACTUATABLE DIRECTION CONTROLLED DRIVE TRANSMISSION SYSTEM

[76] Inventor: Vernon A. Unruh, 524 W. 8th, Larned, Kans. 67550

[21] Appl. No.: 567,026

[22] Filed: Dec. 4, 1995

[51] Int. Cl.[6] .................................................. B62D 11/02
[52] U.S. Cl. .......................... 180/6.66; 180/366; 180/357
[58] Field of Search ................................. 180/6.2, 6.62, 180/6.66, 6.7, 8.7, 65.6, 350, 357, 364, 366, 65.1; 474/1, 4, 7, 5, 37, 38; 74/11, 16.63, 469, 470

[56] References Cited

U.S. PATENT DOCUMENTS

| | | | |
|---|---|---|---|
| 617,332 | 1/1899 | Glazier | 180/366 |
| 765,141 | 7/1904 | Killiam . | |
| 1,505,371 | 8/1924 | Butler | 180/6.66 |
| 2,254,592 | 9/1941 | Berkeley | 74/216.5 |
| 2,311,393 | 2/1943 | Honeywell | 180/6.66 |
| 2,513,436 | 7/1950 | Vandergriff | 74/242.1 |
| 2,689,620 | 7/1954 | Hainke | 180/19 |
| 2,995,944 | 8/1961 | Ciaccio | 74/217 |
| 3,057,216 | 10/1962 | Smith | 74/217 |
| 3,062,065 | 11/1962 | Shaw | 74/217 |
| 3,098,396 | 7/1963 | Unruh | 74/242 |
| 3,230,694 | 1/1966 | Fairbank | 180/6.66 |
| 3,235,019 | 2/1966 | Peterson | 180/6.66 |
| 3,255,834 | 6/1966 | Snavely | 180/6.66 |
| 3,360,999 | 1/1968 | Mullet | 180/6.66 |
| 3,367,436 | 2/1968 | Fox | 180/6.2 |
| 3,550,463 | 12/1970 | Halls | 74/226 |
| 3,575,252 | 4/1971 | Konyha | 180/70 |
| 3,796,275 | 3/1974 | Bouher | 180/6.4 |
| 3,823,791 | 7/1974 | Sheler | 180/6.66 |
| 4,369,851 | 1/1983 | Laborde | 180/6.66 |
| 4,977,970 | 12/1990 | Steiger | 180/6.2 |

*Primary Examiner*—Brian L. Johnson
*Assistant Examiner*—Gary Savitt
*Attorney, Agent, or Firm*—Flanagan & Flanagan; John R. Flanagan; John K. Flanagan

[57] ABSTRACT

A directional drive transmission control system drivingly coupling a rotary output drive source of a powered vehicle with a pair of drive wheels thereof, includes right and left pairs of forward and reverse drive pulleys rotatably mounted on and rotatable relative to right and left transverse drive shafts and drivingly connected with the rotary output drive source so as to rotatably drive forward and reverse drive pulleys in opposite directions. The directional drive transmission control system also includes right and left pairs of clutches mounted to the respective right and left transverse drive shafts and a drive direction control mechanism movable from a neutral position in either first or second opposite directions for actuating concurrently first or second ones of the clutches of the right and left pairs thereof to drivingly interengage and cause rotation of the right and left transverse drive shafts with respective forward or reverse drive pulleys of the right and left pairs thereof and thereby rotation and movement of the drive wheels in either forward or reverse directions.

23 Claims, 4 Drawing Sheets

5,706,907

DUAL LEVER CLUTCH ACTUATABLE DIRECTION CONTROLLED DRIVE TRANSMISSION SYSTEM

BACKGROUND OF THE INVENTION

1. Field of the Invention

The present invention generally relates to a powered vehicle drive system and, more particularly, is concerned with a powered vehicle drive system having a drive transmission with pairs of clutches actuated and directionally controlled by movement of a pair of hand levers.

2. Description of the Prior Art

Self-propelled or powered vehicles, such as farm and utility implements for instance mowers, backhoes, loaders and the like, typically have a mobile chassis with front caster or steerable wheels and rear drive wheels and a drive power source, such as an engine, mounted on the chassis. Some such vehicles employ a hydraulic drive transmission system made up of various arrangements of hydraulic components which interconnect the drive power source with the drive wheels and function to transmit rotary power to the drive wheels and to control the direction of such rotation. Other such vehicles employ a mechanical drive transmission system made up of various arrangements of mechanical components which likewise interconnect the drive power source with the drive wheels and function to transmit rotary power to the drive wheels and to control the direction of such rotation.

Many of the prior art hydraulic and mechanical drive transmission systems are unduly complex and costly. Many of their arrangements of hydraulic and mechanical components make the systems too susceptible to breakdown and malfunction thus lacking in durability and reliability.

Consequently, a need still exists for an improved drive transmission system which will overcome the drawbacks of the prior art without introducing new ones in their place.

SUMMARY OF THE INVENTION

The present invention provides a dual lever clutch directional drive transmission control system designed to satisfy the aforementioned need. The directional drive transmission control system of the present invention employs right and left pairs of clutches coupled with right and left pairs of drive pulleys rotatably driven in opposite directions by the drive power source of the powered vehicle. The directional drive transmission control system also employs a pair of hand levers coupled with idler pulleys and belts so as to move the idler pulleys and belts relative to the clutches and actuate selected ones of the right and left pairs of clutches which will drivingly couple the rotary motion of the desired selected ones of the drive pulleys to the drive wheels of the vehicle and cause the vehicle to move either in forward or reverse directions or to turn right or left.

Accordingly, the present invention is directed to a directional drive transmission control system for drivingly coupling a rotary output drive source of a powered vehicle to a pair of rotatable driven elements coupled to and rotatable with a pair of drive wheels of the powered vehicle. The directional drive transmission control system comprises: (a) a pair of right and left independently rotatable transverse drive shafts, preferably, being axially aligned with one another; (b) a pair of right and left rotatable drive elements each fixed on and rotatable with a respective one of the right and left transverse drive shafts; (c) means for drivingly coupling each of the rotatable drive elements with a respective one of the rotatable driven elements; (d) right and left pairs of forward and reverse drive pulleys rotatably mounted on the respective right and left transverse drive shafts and rotatable relative thereto; (e) drive connection means for drivingly connecting the right and left pairs of forward and reverse drive pulleys with the rotary output drive source of the powered vehicle so as to rotatably drive the forward and reverse drive pulleys of each of the right and left pairs thereof in first and second opposite rotational directions; (f) right and left pairs of clutches mounted to the right and left transverse drive shafts adjacent to the respective right and left pairs of forward and reverse drive pulleys, each of the clutches being deactuatable such that the clutch drivingly disengages a respective one of the forward and reverse drive pulleys of each of the right and left pairs thereof from the respective one of the right and left transverse drive shafts, each of the clutches being actuatable such that the clutch drivingly interengages the respective one of the forward and reverse drive pulleys of each of the right and left pairs thereof with the respective one of the right and left transverse drive shafts; and (g) drive direction control means movable from a neutral position in a first direction for concurrently actuating first ones of the clutches of the right and left pairs thereof so as to cause rotation of the right and left transverse drive shafts with the respective forward drive pulleys of the right and left pairs thereof and thereby cause rotation of the rotatable drive elements in the first rotational direction and therewith rotation of the rotatable driven elements and movement of the drive wheels in a forward direction. The drive direction control means also is movable from a neutral position in a second direction opposite to the first direction for concurrently actuating second ones of the clutches of the right and left pairs thereof so as to cause rotation of the right and left transverse drive shafts with the respective reverse drive pulleys of the right and left pairs thereof and thereby cause rotation of the rotatable drive elements in the second rotational direction and therewith rotation of the rotatable driven elements and movement of the drive wheels in a reverse direction.

In an exemplary embodiment, the right and left pairs of clutches are split sheave clutches each having a first part fixed on and rotatable with a respective one of the forward and reverse drive pulleys of each of the right and left pairs thereof and a second part fixed on and rotatable with a respective one of the right and left transverse drive shafts. The drive direction control means actuates each of the respective clutches by tightly frictionally engaging with the respective first and second parts thereof and deactuates each of the respective clutches by tightly frictionally disengaging from the respectively first and second parts thereof.

More particularly, the drive direction control means includes right and left pairs of idler pulleys and right and left pairs of belts respectively extending over the right and left pairs of idler pulleys and coupled over respective ones of the pairs of right and left split sheave clutches. The drive direction control means also includes a pair of right and left levers each operable independently, preferably manually, for moving a respective one of the right and left pairs of idler pulleys relative to the respective split sheave clutches so as to tension selected ones of the belts relative to selected ones of the split sheave clutches and thereby drivingly transmit the rotary motion of selected ones of the forward and reverse drive pulleys to the rotatable driven elements and drive wheels of the vehicle via the respective right and left transverse drive shafts and and right and left rotatable drive elements.

Further, in a first embodiment, the drive connection means for drivingly connecting the right and left pairs of forward and reverse drive pulleys with the rotary output drive source includes a pair of gearboxes each having an input shaft with an input sheave fixed thereon and a pair of output shafts with respective output sheaves fixed thereon. The input sheave of each gearbox is coupled to the rotary output drive source by an endless flexible member. The output sheaves of each gearbox is coupled to respective ones of the forward and reverse drive pulleys of the right and left pairs thereof on the respective right and left transverse drive shafts. The gearboxes are preferably disposed on opposite sides of the axially-aligned right and left transverse drive shafts.

Alternatively, in a second embodiment, the drive connection means for drivingly connecting the right and left pairs of forward and reverse drive pulleys with the rotary output drive source includes an endless flexible member, such as a drive belt, coupled about the rotary output drive source, such as an output pulley on an engine rotary output shaft, for undergoing movement along a continuous path, and a plurality of idler sheaves rotatably mounted on a corresponding plurality of vertical shafts disposed between the output pulley and drive pulleys. The idler pulleys are aligned with the respective output pulley and drive pulleys so as to arrange the continuous path of movement of the endless belt about the drive pulleys to cause rotation of the respective drive pulleys in the same desired first and second opposite rotational directions as in the first embodiment.

These and other features and advantages of the present invention will become apparent to those skilled in-the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
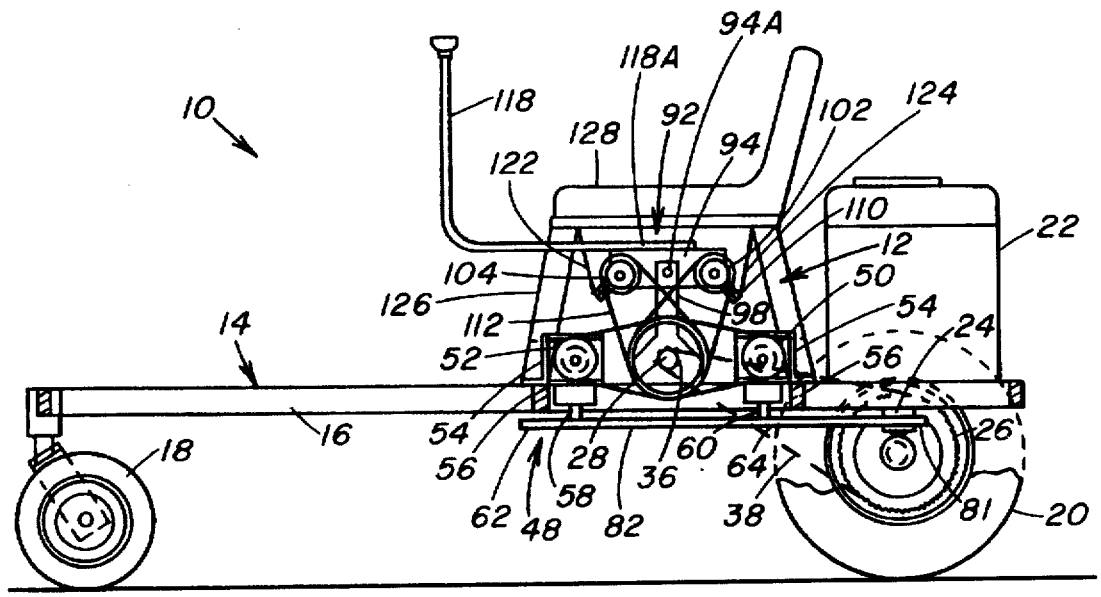
FIG. 1 is a side elevational view of a powered vehicle employing a directional drive transmission control system of the present invention being shown in a neutral condition.
Figure 2:
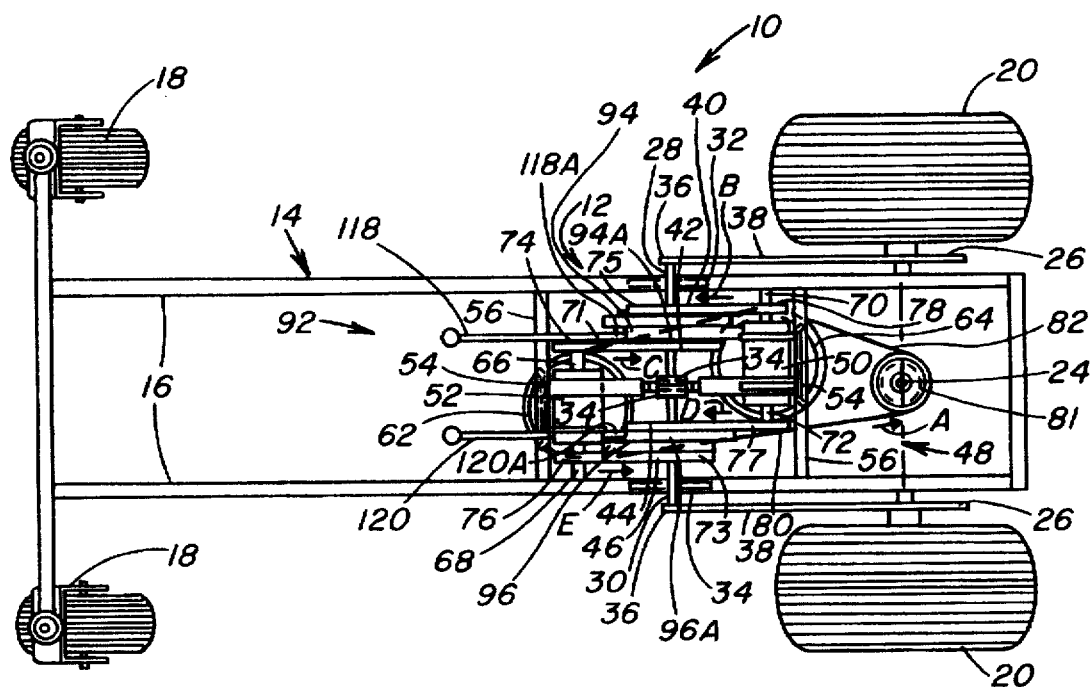
FIG. 2 is a top plan view of the powered vehicle of FIG. 1, showing a first embodiment of a drive connection arrangement on the powered vehicle for drivingly connecting right and left pairs of forward and reverse drive pulleys with the rotary output drive source of the vehicle.
Figure 3:
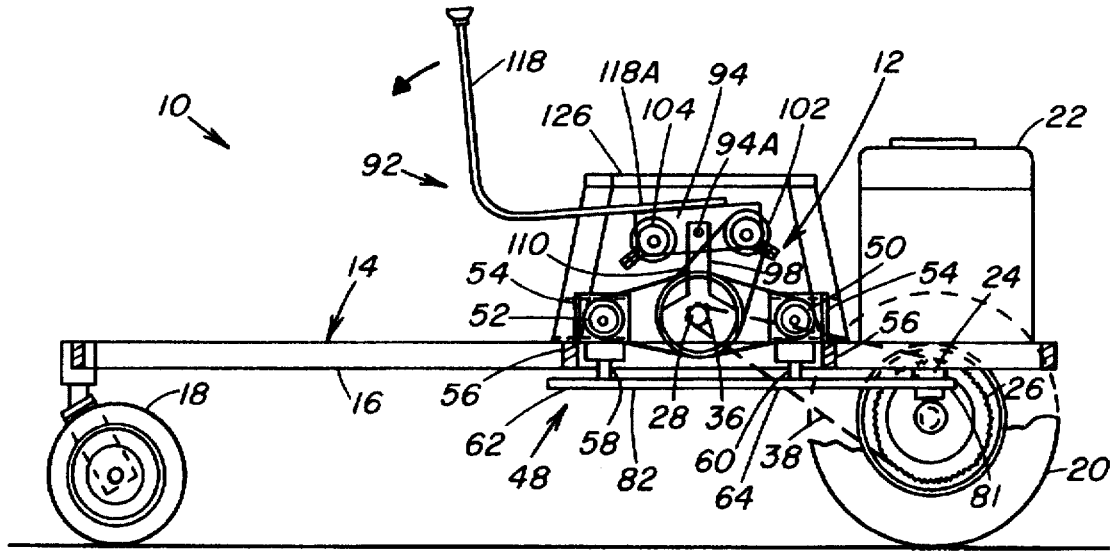
FIG. 3 is another side elevational view of the powered vehicle with the drive transmission control system being shown in a forward drive condition.

Referring to the drawings, and particularly to FIGS. 1 and 2, there is illustrated a powered vehicle, generally designated 10, employing a dual lever clutch directional drive transmission control system, generally designated 12, being constructed in accordance with the principles of the present invention. In the illustrated example, the powered vehicle 10 employing the drive transmission control system 12 includes a mobile chassis 14 having an elongated frame 16, a pair of front swivel wheels 18 supporting a front portion of the frame 16, and a pair of rear drive wheels 20 supporting a rear portion of the frame 16, and an engine 22 mounted on the rear portion of the frame 16 between the rear drive wheels 20 and having a rotary output drive shaft 24 extending vertically downwardly between the rear drive wheels 20.

The drive transmission control system 12 of the present invention is mounted on the frame 16 such that most of the system 12 extends thereabove. Also, the system 12 is disposed adjacent to and forwardly of the engine 22 and rear drive wheels 20. The system 12 drivingly transmits and couples the rotary drive motion produced by the rotary output drive shaft 24 of the engine 22 to the rear drive wheels 20 so as to cause forward and reverse movement of the vehicle 10 and also to cause right and left turning movement thereof.

Referring to FIGS. 1 to 4, the drive transmission control system 12 of the present invention includes a pair of right and left rotatable driven elements in the form of driven sprockets 26. The right and left driven sprockets 26 are fixed to and thus rotatable with respective ones of the right and left drive wheels 20. The system 12 also includes a pair of right and left transverse drive shafts 28, 30 rotatably mounted independently of one another on the frame 16 by respective right and left end bearings 32 and middle bearings 34. Also, the right and left drive shafts 28, 30 are preferably axially aligned with one another. The system 12 further includes a pair of right and left rotatable drive elements in the form of drive sprockets 36 each fixed on and rotatable with a respective one of the right and left transverse drive shafts 28, 30 at respective outer ends thereof, as best seen in FIG. 2. The system 12 still further includes motion transmitting means in the form of a pair of right and left endless drive chains 38 which extend between and over and thereby independently drivingly couple the respective right and left drive sprockets 36 with the respective right and left driven sprockets 26 and thereby with the right and left rear drive wheels 20.

Figure 4:
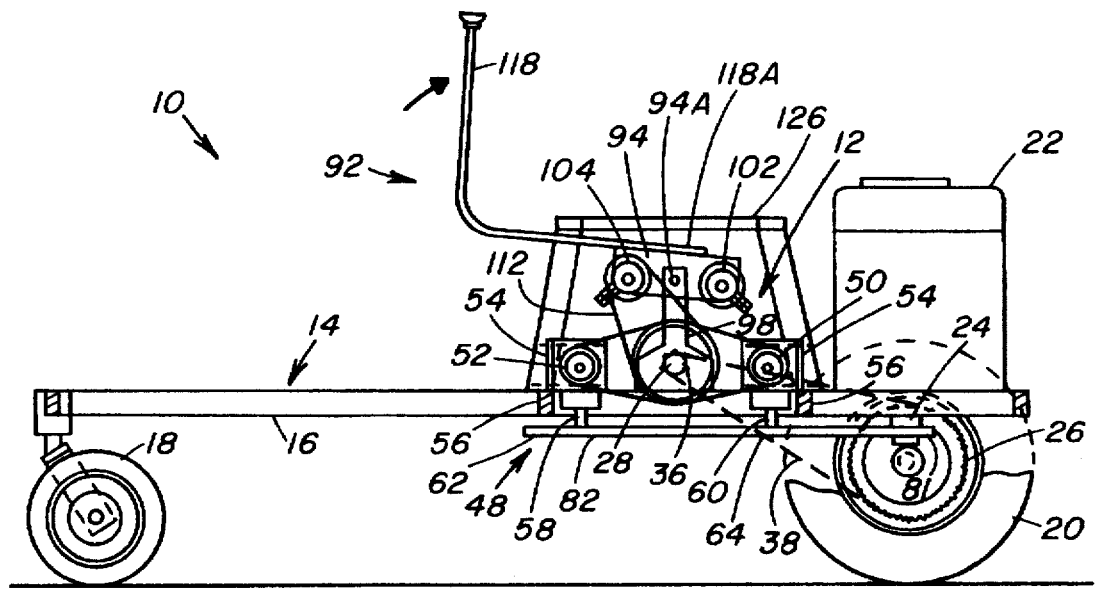
FIG. 4 is still another side elevational view of the powered vehicle with the drive transmission control system being shown in a reverse drive condition.
Figure 5:
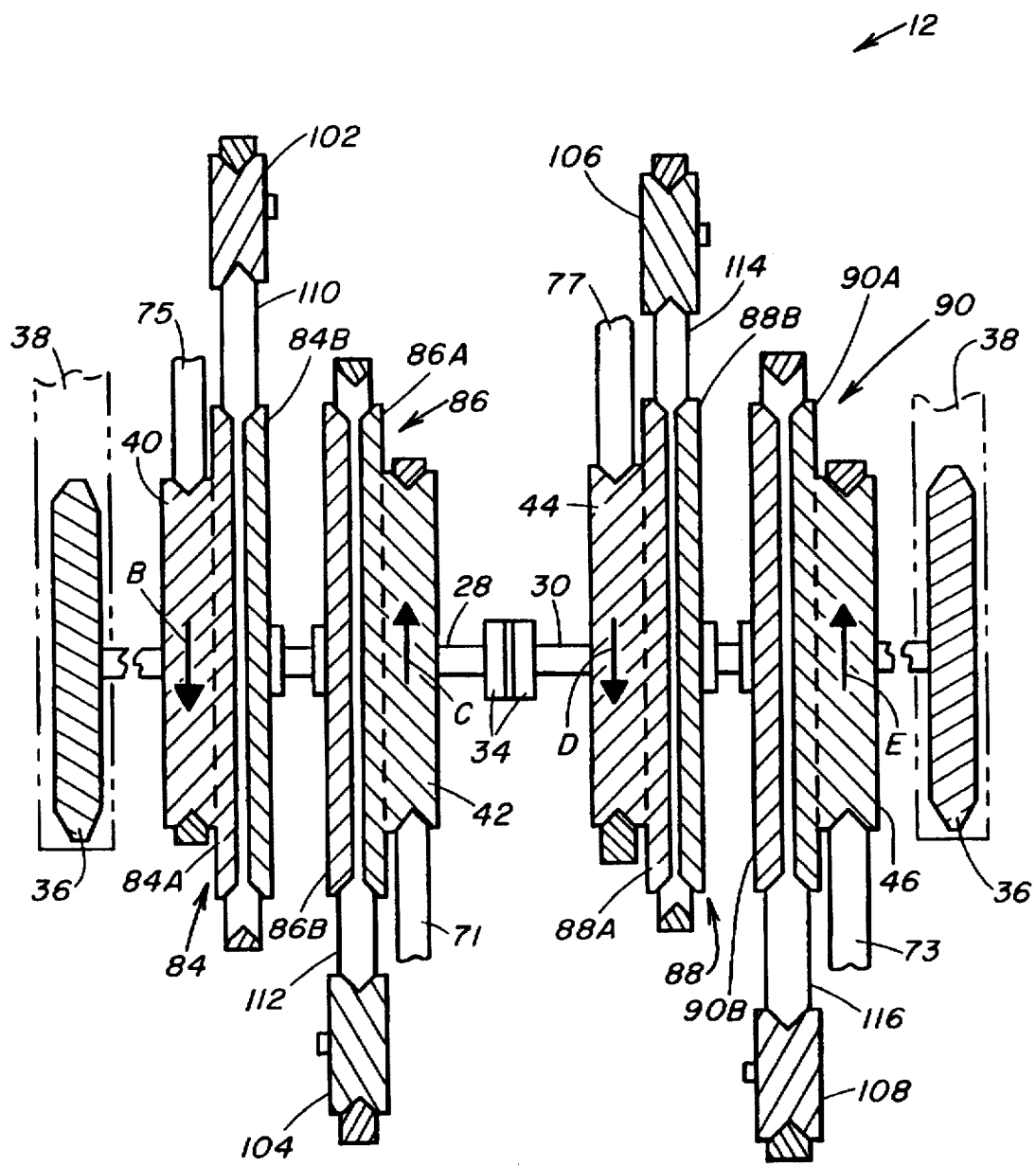
FIG. 5 is an enlarged diametral sectional view of right and left pairs of split sheave clutches, right and left pairs of forward and reverse drive pulleys, and forward and reverse idler pulleys and belts of the drive transmission control system.

Referring again to FIGS. 1–4 and now also to FIG. 5, the drive transmission control system 12 of the present invention further includes right and left pairs of forward and reverse drive pulleys 40, 42 and 44, 46 rotatably mounted on the respective right and left transverse drive shafts 28, 30 and rotatable relative thereto. The system 12 also includes a first embodiment of a drive connection means, generally designated 48, for drivingly connecting the forward and reverse drive pulleys 40, 42 and 44, 46 of the right and left pairs thereof with the rotary output drive shaft 24 of the engine 22 so as to rotatably power the forward and reverse drive pulleys 40, 42 and 44, 46 in respective first and second opposite rotational directions. More particularly, in the first exemplary embodiment illustrated in FIGS. 1–4, the drive connection means 48 includes a pair of front and rear gearboxes 50, 52 fixedly mounted by respective brackets 54 to forward and rear cross members 56 of the frame 16 and preferably disposed on respective opposite front and rear sides of the axially-aligned right and left transverse drive shafts 28, 30. Each of the gearboxes 50, 52 has an input shaft 58, 60 with an input sheave 62, 64 fixed thereon and a pair of output shafts 66, 68 and 70, 72 with respective output sheaves 74, 76 and 78, 80 fixed thereon. The input sheaves 62, 64 of the respective front and rear gearboxes 50, 52 are coupled to an output pulley 81 on the rotary output drive shaft 24 of the engine 22 by a common endless flexible member in the form of a continuous belt 82 which extends between and over the respective input sheaves 62, 64 and output pulley 81. The rotary output drive shaft 24 of the engine 22 drives the continuous belt 82 in the direction of arrow A. Referring to FIGS. 2 and 5, the output sheaves 74, 76 and 78, 80 of the respective front and rear gearboxes 50, 52 are coupled to the respective reverse and forward drive pulleys 42, 46 and 40, 44 by respective belts 71, 73 and 75, 77. The top spans of the respective belts 71, 73, 75, 77 move in the directions of arrows B, C, D, E.

Referring to FIG. 5, the drive transmission control system 12 of the present invention also includes right and left pairs of clutches 84, 86 and 88, 90 mounted to the right and left transverse drive shafts 28, 30 adjacent to the respective right and left pairs of forward and reverse drive pulleys 40, 42 and 44, 46. While in the illustrated embodiment, the clutches 84, 86 and 88, 90 are split sheave clutches, other types of clutches can be employed in the drive transmission control system 12 of the present invention. Each of the split sheave clutches 84, 86, 88, 90 has a first part 84A, 86A, 88A, 90A fixed on and rotatable with a respective one of the forward and reverse drive pulleys 40, 42, and 44, 46 of the right and left pairs thereof and a second part 84B, 86B, 88B, 90B fixed on and rotatable with a respective one of the right and left transverse drive shafts 28, 30.

Finally, the drive transmission control system 12 of the present invention includes a drive direction control means 92 movable in a first direction for actuating by tightly frictionally engaging concurrently first ones of the split sheave clutches 84, 86 and 88, 90 of the right and left pairs thereof so as to cause rotation of the right and left transverse drive shafts 28, 30 with the respective forward drive pulleys 40, 44 of the right and left pairs thereof and thereby cause rotation of the right and left drive sprockets 36 in the first rotational direction and therewith rotation of the driven sprockets 26 in the same direction and movement of the right and left rear drive wheels 20 in a forward direction. Also, the drive direction control means 92 is movable in a second direction opposite to the first direction for actuating by tightly frictionally engaging concurrently second ones of the split sheave clutches 84, 86 and 88, 90 of the right and left pairs thereof so as to cause rotation of the right and left transverse drive shafts 28, 30 with the respective reverse drive pulleys 42, 46 of the right and left pairs thereof and thereby cause rotation of the right and left drive sprockets 36 in the second rotational direction and therewith rotation of the right and left driven sprockets 26 in the same direction and movement of the right and left rear drive wheels 20 in a reverse direction. When the drive directional control means 92 is not moved in either first nor second direction, it is disposed at a neutral position in which it deactuates by tightly frictionally disengaging from the first and second ones of the clutches 84, 86 and 88, 90.

More particularly, referring to FIGS. 1-5, the drive direction control means 92 includes a pair of right and left brackets 94, 96 pivotally mounted at middle locations 94A, 96A thereon to upper ends of right and left upright support members 98 fixedly attached to the frame 16, right and left pairs of forward and reverse idler pulleys 102, 104 and 106, 108 rotatably mounted to front and rear portions of the right and left brackets 94, 96 on opposite sides of the middle locations 94A, 96A thereon, and right and left pairs of belts 110, 112 and 114, 116, each extending between and coupled over one of the forward and reverse idler pulleys 102, 104 and 106, 108 of the right and left pairs thereof and a respective one of the split sheave clutches 84, 86 and 88, 90 of the right and left pairs thereof. The drive direction control means 92 also includes a pair of right and left control levers 118, 120 each operable independently of the other, and preferably manually by the user. The right and left control levers 118, 120 are rigidly attached at rear ends 118A, 120A thereof to the respective right and left brackets 94, 96. Raising or pulling upwardly the right and left control levers 118, 120 and depressing or pushing downwardly the right and left control levers 118, 120 causes pivoting the brackets 94, 96 about the middle locations 94A, 96A and thereby moving of the right and left pairs of forward and reverse idler pulleys 102, 104 and 106, 108 toward and away from the respective right and left pairs of split sheave clutches 84, 86 and 88, 90 so as to place selected ones of the belts 110, 112 and 114, 116 of the right and left pairs thereof respectively in conditions of slack or tension relative to selected ones of the split sheave clutches 84, 86 and 88, 90 and thereby drivingly transmit the rotary motion of selected ones of the forward and reverse drive pulleys 40, 42 and 44, 46 of the right and left pairs thereof to the right and left driven sprockets 26 and right and left rear drive wheels 20 of the vehicle 10 via the respective right and left transverse drive shafts 28, 30, right and left drive sprockets 36 thereon and right and left drive chains 38. The drive direction control means 92 further includes right and left pairs of centering springs 122, 124 (only one pair being seen in FIG. 1). The springs 122, 124 extend between front and rear end portions of the brackets 94, 96 and forward and rearward portions of a platform superstructure 126 fixed mounted upon the frame 16 and extending above and enclosing the drive transmission control system 12. The springs 122, 124 function to maintain the right and left control levers 118, 120, right and left brackets 94, 96 and forward and reverse idler pulleys 102, 104 and 106, 108 in a horizontal balanced or centered position wherein the drive transmission control system 12 is in a neutral condition with the rear wheels 20 of the vehicle 10 stationary. (Only the right control lever 118, right bracket 94, and forward and reverse idler pulleys 102, 104 are seen in FIG. 1) Also, the vehicle 10 has a seat 128 which is removably disposed on the top of the platform superstructure 126, as seen in FIG. 1.

As described above, the drive transmission control system 12 is operable to cause movement of the vehicle 10 in forward and reverse directions and also to cause right and left turns of the vehicle 10. FIG. 1 shows the drive transmission control system 12 in a neutral position in which the right and left control levers 118, 120 are disposed in generally horizontal positions in which the belts 110, 112 and 114, 116 are disposed in slack conditions with all of the split sheave clutches 84, 86 and 88, 90. To cause forward movement of the vehicle 10, the right and left control levers 118, 120 are depressed from the position seen in FIG. 1 to the position seen in FIG. 3. When both right and left control levers 118, 120 are depressed, the forward idler pulleys 102, 106 are raised and the belts 110, 114 are thereby placed under tension over and thus in tight frictional engagement with the two split sheave clutches 84, 88 causing transmission of forward drive rotary motion to both of the rear wheels 20.

To cause reverse movement of the vehicle 10, the right and left control levers 118, 120 are raised from the position seen in FIG. 1 to the position seen in FIG. 4. When both right and left control levers 118, 120 are raised, the reverse idler pulleys 104, 118 are raised and the belts 112, 116 are thereby placed under tension over and thus in tight frictional engagement with the two split sheave clutches 86, 90 causing transmission of reverse drive rotary motion to both the rear wheels 20.

To cause a right turn of the vehicle 10, the left control lever 120 is depressed while the right control lever 118 is raised. When the left control lever 120 is depressed and the right control lever 118 is raised, the forward idler pulley 106 is raised and the reverse idler pulley 104 is raised and the belts 114, 112 are thereby placed under tension over the two split sheave clutches 88, 86 causing transmission of forward drive rotary motion to the left rear wheel 20 and reverse drive rotary motion to the right rear wheel 20.

To cause a left turn of the vehicle 10, the right control lever 118 is depressed while the left control lever 120 is raised. When the right control lever 118 is depressed and the left control lever 120 is raised, the forward idler pulley 102 is raised and the reverse idler pulley 108 is raised and the belts 110, 116 are thereby placed under tension over the two split sheave clutches 84, 90 causing transmission of forward drive rotary motion to the right rear wheel 20 and reverse drive rotary motion to the left rear wheel 20.

Figure 6:
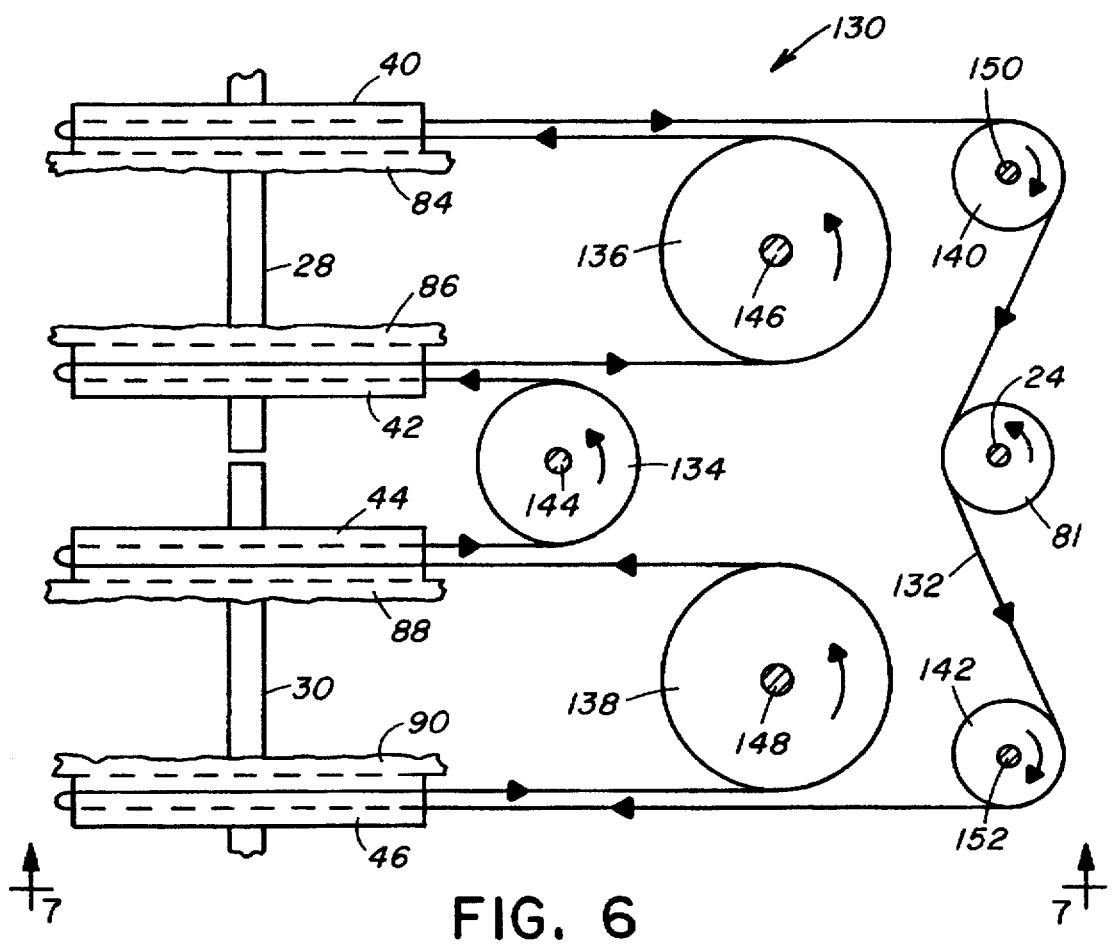
FIG. 6 is a diagrammatic top plan view of a second embodiment of a drive connection arrangement on the powered vehicle for drivingly connecting right and left pairs of forward and reverse drive pulleys with the rotary output drive source of the vehicle.
Figure 7:
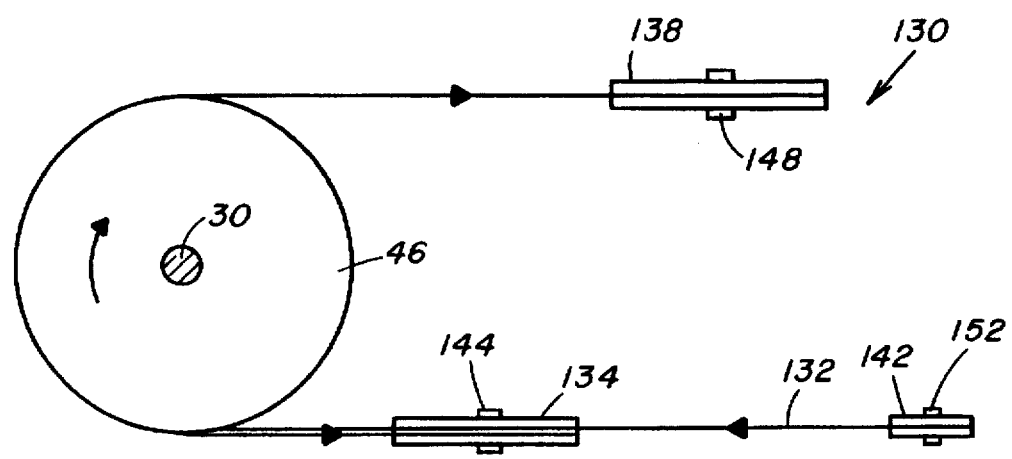
FIG. 7 is a side elevational view of the drive connection arrangement of FIG. 6 as seen along line 7—7 of FIG. 6.

Referring to FIGS. 6 and 7, there is illustrated a second alternative embodiment of drive connection means, generally designated 130 for drivingly connecting the right and left pairs of forward and reverse drive pulleys 40, 42 and 44, 46 with the rotary output drive shaft 24 of the engine 22. Instead of employing the front and rear gearboxes 50, 52 as in the case of the first embodiment, the drive connection means 130 of the second embodiment employs an endless flexible member 132, preferably in the form of an endless flexible belt, coupled about the output pulley 81 on the rotary output drive shaft 24 for undergoing movement along a continuous path. The drive connection means 130 also includes a plurality of idler sheaves 134, 136, 138, 140, 142 rotatably mounted on a corresponding plurality of vertical shafts 144, 146, 148, 150, 152 which, in turn, are mounted on the chassis 14 between the rotary output drive shaft 24 and the forward and reverse drive pulleys 40, 42 and 44, 46. The idler sheaves 134, 136, 138, 140, 142 are aligned with the respective output pulley 81 and the forward and reverse drive pulleys 40, 42 and 44, 46 so as to arrange the continuous path of movement of the endless flexible belt 132 about the forward and reverse drive pulleys 40, 42 and 44, 46 to cause rotation thereof in the first and second opposite directions. The flexible belt 132 also is capable of twisting ninety degrees as it travels between the idler sheaves 134, 136, 138, 140, 142 and the forward and reverse drive pulleys 40, 42 and 44, 46.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A drive transmission control system for drivingly coupling a rotary output drive source of a powered vehicle to a pair of rotatable driven elements independently coupled to and rotatable with respective ones of a pair of drive wheels of a powered vehicle, said drive transmission control system comprising:

(a) a pair of right and left independently rotatable transverse drive shafts;

(b) a pair of rotatable drive elements each fixed on and rotatable with a respective one of said right and left transverse drive shafts;

(c) means for drivingly coupling each of said rotatable drive elements with the respective rotatable driven elements;

(d) right and left pairs of forward and reverse drive pulleys rotatably mounted on said respective right and left transverse drive shafts and rotatable relative thereto;

(e) drive connection means for drivingly connecting the right and left pairs of forward and reverse drive pulleys with the rotary output drive source of the powered vehicle so as to rotatably drive said forward and reverse drive pulleys of each of the right and left pairs thereof in first and second opposite rotational directions;

(f) right and left pairs of clutches mounted to said right and left transverse drive shafts adjacent to said respective right and left pairs of forward and reverse drive pulleys, each of said clutches being deactuatable such that said clutch drivingly disengages a respective one of said forward and reverse drive pulleys of each of said right and left pairs thereof from said respective one of said right and left transverse drive shafts, each of said clutches being actuatable such that said clutch drivingly interengages said respective one of said forward and reverse drive pulleys of each of said right and left pairs thereof with said respective one of said right and left transverse drive shafts; and (g) drive direction control means movable from a neutral position in a first direction for concurrently actuating first ones of said clutches of said right and left pairs thereof so as to cause rotation of said right and left transverse drive shafts with said respective forward drive pulleys of said right and left pairs thereof and thereby cause rotation of said rotatable drive elements in said first rotational direction and therewith rotation of said rotatable driven elements and movement of the drive wheels in a forward direction, said drive direction control means being movable from said neutral position in a second direction opposite to said first direction for concurrently actuating second ones of said clutches of said right and left pairs thereof so as to cause rotation of said right and left transverse drive shafts with said respective reverse drive pulleys of said right and left pairs thereof and thereby cause rotation of said rotatable drive elements in said second rotational direction and therewith rotation of said rotatable driven elements and movement of the drive wheels in a reverse direction;

(h) wherein said right and left pairs of clutches are split sheave clutches each having a first part fixed on and rotatable with a respective one of said forward and reverse drive pulleys of each of said right and left pairs thereof and a second part fixed on and rotatable with a respective one of said right and left transverse drive shafts, said drive direction control means actuating each of said respective clutches by tightly frictionally engaging with said respective first and second parts thereof and deactuating each of said respective clutches by tightly frictionally disengaging from said respective first and second parts thereof;

(i) wherein said drive direction control means includes right and left pairs of idler pulleys, and
right and left pairs of belts respectively extending over said right and left pairs of idler pulleys and coupled over respective ones of said pairs of right and left split sheave clutches.

2. The system of claim 1 wherein said means for drivingly coupling each of said rotatable drive elements with a respective one of the rotatable driven elements is a pair of endless flexible members.

3. The system of claim 1 wherein said rotatable drive elements are drive sprockets.

4. The system of claim 3 wherein said endless flexible members are endless drive chains.

5. The system of claim 1 wherein said drive direction control means includes a pair of right and left control levers each operable independently in one of said first and second directions from said neutral position for actuating and deactuating respective ones of said right and left pairs of clutches and thereby drivingly transmit the rotary motion of selected ones of said forward and reverse drive pulleys to the rotatable driven elements and drive wheels of the vehicle via said respective right and left transverse drive shafts and and right and left rotatable drive elements.

6. The system of claim 1 wherein said drive direction control means also includes a pair of right and left control levers each operable independently for moving a respective one of said right and left pairs of idler pulleys relative to said respective split sheave clutches so as to tension selected ones of said belts relative to selected ones of said split sheave clutches and thereby drivingly transmit the rotary motion of selected ones of said forward and reverse drive pulleys to the rotatable driven elements and drive wheels of the vehicle via said respective right and left transverse drive shafts and and right and left rotatable drive elements.

7. The system of claim 1 wherein said drive direction control means also includes right and left brackets respectively rotatably mounting said right and left pairs of idler pulleys on opposite end portions of said respective brackets, each of said brackets being pivotally mounted at locations thereon between said respective idler pulleys mounted thereon.

8. The system of claim 7 wherein said drive direction control means also includes a pair of right and left control levers each attached to one of said brackets and operable independently for moving a respective one of said right and left pairs of idler pulleys relative to said respective split sheave clutches so as to tension selected ones of said belts relative to selected ones of said split sheave clutches and thereby drivingly transmit the rotary motion of selected ones of said forward and reverse drive pulleys to the rotatable driven elements and drive wheels of the vehicle via said respective right and left transverse drive shafts and and right and left rotatable drive elements.

9. A drive transmission control system for drivingly coupling a rotary output drive source of a powered vehicle to a pair of rotatable driven elements independently coupled to and rotatable with respective ones of a pair of drive wheels of a powered vehicle, said drive transmission control system comprising:

(a) a pair of right and left independently rotatable transverse drive shafts;

(b) a pair of rotatable drive elements each fixed on and rotatable with a respective one of said right and left transverse drive shafts;

(c) means for drivingly coupling each of said rotatable drive elements with the respective rotatable driven elements;

(d) right and left pairs of forward and reverse drive pulleys rotatably mounted on said respective right and left transverse drive shafts and rotatable relative thereto;

(e) drive connection means for drivingly connecting the right and left pairs of forward and reverse drive pulleys with the rotary output drive source of the powered vehicle so as to rotatably drive said forward and reverse drive pulleys of each of the right and left pairs thereof in first and second opposite rotational directions;

(f) right and left pairs of clutches mounted to said right and left transverse drive shafts adjacent to said respective right and left pairs of forward and reverse drive pulleys, each of said clutches being deactuatable such that said clutch drivingly disengages a respective one of said forward and reverse drive pulleys of each of said right and left pairs thereof from said respective one of said right and left transverse drive shafts, each of said clutches being actuatable such that said clutch drivingly interengages said respective one of said forward and reverse drive pulleys of each of said right and left pairs thereof with said respective one of said right and left transverse drive shafts; and (g) drive direction control means movable from a neutral position in a first direction for concurrently actuating first ones of said clutches of said right and left pairs thereof so as to cause rotation of said right and left transverse drive shafts with said respective forward drive pulleys of said right and left pairs thereof and thereby cause rotation of said rotatable drive elements in said first rotational direction and therewith rotation of said rotatable driven elements and movement of the drive wheels in a forward direction, said drive direction control means being movable from said neutral position in a second direction opposite to said first direction for concurrently actuating second ones of said clutches of said right and left pairs thereof so as to cause rotation of said right and left transverse drive shafts with said respective reverse drive pulleys of said right and left pairs thereof and thereby cause rotation of said rotatable drive elements in said second rotational direction and therewith rotation of said rotatable driven elements and movement of the drive wheels in a reverse direction;

(h) wherein said drive connection means for drivingly connecting said right and left pairs of forward and reverse drive pulleys with the rotary output drive source includes a pair of gearboxes each having an input shaft with an input sheave fixed thereon and a pair of output shafts with respective output sheaves fixed thereon, said input sheave of each gearbox being coupled to the rotary output drive source, said output sheaves of each gearbox being coupled to respective ones of said forward and reverse drive pulleys of said right and left pairs thereof on said respective right and left transverse drive shafts.

10. The system of claim 9 wherein said input sheave of each of said gearboxs is coupled to the rotary output drive source by an endless flexible member.

11. The system of claim 9 wherein said drive direction control means includes a pair of right and left control levers each operable independently in one of said first and second directions from said neutral position for actuating and deactuating respective ones of said right and left pairs of clutches and thereby drivingly transmit the rotary motion of selected ones of said forward and reverse drive pulleys to the rotatable driven elements and drive wheels of the vehicle via said respective right and left transverse drive shafts and and right and left rotatable drive elements.

12. A drive transmission control system for drivingly coupling a rotary output drive source of a powered vehicle to a pair of rotatable driven elements independently coupled to and rotatable with respective ones of a pair of drive wheels of a powered vehicle, said drive transmission control system comprising:

(a) a pair of right and left independently rotatable transverse drive shafts;

(b) a pair of rotatable drive elements each fixed on and rotatable with a respective one of said right and left transverse drive shafts;

(c) means for drivingly coupling each of said rotatable drive elements with the respective rotatable driven elements;

(d) right and left pairs of forward and reverse drive pulleys rotatably mounted on said respective right and left transverse drive shafts and rotatable relative thereto;

(e) drive connection means for drivingly connecting the right and left pairs of forward and reverse drive pulleys with the rotary output drive source of the powered vehicle so as to rotatably drive said forward and reverse drive pulleys of each of the right and left pairs thereof in first and second opposite rotational directions;

(f) right and left pairs of clutches mounted to said right and left transverse drive shafts adjacent to said respective right and left pairs of forward and reverse drive pulleys, each of said clutches being deactuatable such that said clutch drivingly disengages a respective one of said forward and reverse drive pulleys of each of said right and left pairs thereof from said respective one of said right and left transverse drive shafts, each of said clutches being actuatable such that said clutch drivingly interengages said respective one of said forward and reverse drive pulleys of each of said right and left pairs thereof with said respective one of said right and left transverse drive shafts; and (g) drive direction control means movable from a neutral position in a first direction for concurrently actuating first ones of said clutches of said right and left pairs thereof so as to cause rotation of said right and left transverse drive shafts with said respective forward drive pulleys of said right and left pairs thereof and thereby cause rotation of said rotatable drive elements in said first rotational direction and therewith rotation of said rotatable driven elements and movement of the drive wheels in a forward direction, said drive direction control means being movable from said neutral position in a second direction opposite to said first direction for concurrently actuating second ones of said clutches of said right and left pairs thereof so as to cause rotation of said right and left transverse drive shafts with said respective reverse drive pulleys of said right and left pairs thereof and thereby cause rotation of said rotatable drive elements in said second rotational direction and therewith rotation of said rotatable driven elements and movement of the drive wheels in a reverse direction;

(h) wherein said drive connection means for drivingly connecting said right and left pairs of forward and reverse drive pulleys with the rotary output drive source includes an endless flexible member coupled about the rotary output drive source for undergoing movement along a continuous path, and a plurality of idler sheaves rotatably mounted on a corresponding plurality of vertical shafts disposed between the rotary output drive source and said forward and reverse drive pulleys, said idler sheaves being aligned with the respective rotary output drive source and said forward and reverse drive pulleys so as to arrange said continuous path of movement of said endless flexible about said forward and reverse drive pulleys to cause rotation thereof in said first and second opposite rotational directions.

13. The system of claim 13 wherein said drive direction control means includes a pair of right and left control levers each operable independently in one of said first and second directions from said neutral position for actuating and deactuating respective ones of said right and left pairs of clutches and thereby drivingly transmit the rotary motion of selected ones of said forward and reverse drive pulleys to the rotatable driven elements and drive wheels of the vehicle via said respective right and left transverse drive shafts and and right and left rotatable drive elements.

14. In a powered vehicle including a chassis, a pair of right and left drive wheels movably supporting said chassis and an engine mounted on said chassis and having a rotary output drive shaft, a drive transmission control system mounted on said chassis for drivingly transmitting and coupling rotary drive motion produced by said rotary output drive shaft of said engine to said right and left drive wheels so as to cause forward and reverse movement of said vehicle and also to cause right and left turning movement thereof, said system comprising:

(a) a pair of right and left rotatable driven elements each coupled to and rotatable with one of said right and left drive wheels;

(b) a pair of right and left transverse drive shafts rotatably mounted independently of one another to said frame;

(c) a pair of right and left rotatable drive elements each fixed on and rotatable with a respective one of said right and left transverse drive shafts;

(d) means for independently drivingly coupling each of said rotatable drive elements with one of said respective rotatable driven elements;

(e) right and left pairs of forward and reverse drive pulleys rotatably mounted on said respective right and left transverse drive shafts and rotatable relative thereto;

(f) drive connection means for drivingly connecting said right and left pairs of forward and reverse drive pulleys with said rotary output drive shaft of said engine so as to rotatably drive said forward and reverse drive pulleys of each of the right and left pairs thereof in first and second opposite rotational directions;

(g) right and left pairs of split sheave clutches mounted to said right and left transverse drive shafts adjacent to said respective right and left pairs of drive pulleys, each of the split sheave clutches having a first part fixed on and rotatable with a respective one of said forward and reverse drive pulleys of each of said right and left pairs thereof and a second part fixed on and rotatable with a respective one of said right and left transverse drive shafts; and (h) drive direction control means movable in a first direction for frictionally engaging concurrently first ones of said split sheave clutches of said right and left pairs thereof so as to cause rotation of said right and left transverse drive shafts with said respective forward drive pulleys of said right and left pairs thereof and thereby cause rotation of said rotatable drive elements in the first rotational direction and therewith rotation of said rotatable driven elements and movement of said drive wheels in a forward direction, said drive direction control means being movable in a second direction opposite to the first direction for frictionally engaging concurrently second ones of said split sheave clutches of said right and left pairs thereof so as to cause rotation of said right and left transverse drive shafts with said respective reverse drive pulleys of said right and left pairs thereof and thereby cause rotation of said rotatable drive elements in the second rotational direction and therewith rotation of said rotatable driven elements and movement of the drive wheels in a reverse directional (i) wherein said drive direction control means includes right and left pairs of idler pulleys, and
right and left pairs of belts respectively extending over said right and left pairs of idler pulleys and coupled over respective ones of said pairs of right and left split sheave clutches.

15. The vehicle of claim 14 wherein said means for drivingly coupling each of said rotatable drive elements with a respective one of the rotatable driven elements is a pair of endless flexible members.

16. The vehicle of claim 15 wherein said rotatable drive elements are drive sprockets.

17. The vehicle of claim 16 wherein said endless flexible members are endless drive chains.

18. The vehicle of claim 14 wherein said drive direction control means also includes a pair of right and left control levers each operable independently for moving a respective one of said right and left pairs of idler pulleys relative to said respective split sheave clutches so as to tension selected ones of said belts relative to selected ones of said split sheave clutches and thereby drivingly transmit the rotary motion of selected ones of said forward and reverse drive pulleys to said rotatable driven elements and drive wheels of said vehicle via said respective right and left transverse drive shafts and and right and left rotatable drive elements.

19. The vehicle of claim 14 wherein said drive direction control means also includes right and left brackets respectively rotatably mounting said right and left pairs of idler pulleys on opposite end portions of said respective brackets, each of said brackets being pivotally mounted to said chassis at locations thereon between said respective idler pulleys mounted thereon.

20. The vehicle of claim 19 wherein said drive direction control means also includes a pair of right and left control levers each attached to one of said brackets and operable independently for moving a respective one of said right and left pairs of idler pulleys relative to said respective split sheave clutches so as to tension selected ones of said belts relative to selected ones of said split sheave clutches and thereby drivingly transmit the rotary motion of selected ones of said forward and reverse drive pulleys to said rotatable driven elements and drive wheels of said vehicle via said respective right and left transverse drive shafts and and right and left rotatable drive elements.

21. In a powered vehicle including a chassis, a pair of right and left drive wheels movably supporting said chassis and an engine mounted on said chassis and having a rotary output drive shaft, a drive transmission control system mounted on said chassis for drivingly transmitting and coupling rotary drive motion produced by said rotary output drive shaft of said engine to said right and left drive wheels so as to cause forward and reverse movement of said vehicle and also to cause right and left turning movement thereof, said system comprising:

(a) a pair of right and left rotatable driven elements each coupled to and rotatable with one of said right and left drive wheels;

(b) a pair of right and left transverse drive shafts rotatably mounted independently of one another to said frame;

(c) a pair of right and left rotatable drive elements each fixed on and rotatable with a respective one of said right and left transverse drive shafts;

(d) means for independently drivingly coupling each of said rotatable drive elements with one of said respective rotatable driven elements;

(e) right and left pairs of forward and reverse drive pulleys rotatably mounted on said respective right and left transverse drive shafts and rotatable relative thereto;

(f) drive connection means for drivingly connecting said right and left pairs of forward and reverse drive pulleys with said rotary output drive shaft of said engine so as to rotatably drive said forward and reverse drive pulleys of each of the right and left pairs thereof in first and second opposite rotational directions;

(g) right and left pairs of split sheave clutches mounted to said right and left transverse drive shafts adjacent to said respective right and left pairs of drive pulleys, each of the split sheave clutches having a first part fixed on and rotatable with a respective one of said forward and reverse drive pulleys of each of said right and left pairs thereof and a second part fixed on and rotatable with a respective one of said right and left transverse drive shafts; and (h) drive direction control means movable in a first direction for frictionally engaging concurrently first ones of said split sheave clutches of said right and left pairs thereof so as to cause rotation of said right and left transverse drive shafts with said respective forward drive pulleys of said right and left pairs thereof and thereby cause rotation of said rotatable drive elements in the first rotational direction and therewith rotation of said rotatable driven elements and movement of said drive wheels in a forward direction, said drive direction control means being movable in a second direction opposite to the first direction for frictionally engaging concurrently second ones of said split sheave clutches of said right and left pairs thereof so as to cause rotation of said right and left transverse drive shafts with said respective reverse drive pulleys of said right and left pairs thereof and thereby cause rotation of said rotatable drive elements in the second rotational direction and therewith rotation of said rotatable driven elements and movement of the drive wheels in a reverse direction;

(i) wherein said drive connection means for drivingly connecting said right and left pairs of forward and reverse drive pulleys with said rotary output drive shaft includes a pair of gearboxes each having an input shaft with an input sheave fixed thereon and a pair of output shafts with respective output sheaves fixed thereon, said input sheave of each gearbox being coupled to said rotary output drive shaft, said output sheaves of each gearbox being coupled to respective ones of said forward and reverse drive pulleys of said right and left pairs thereof on said respective right and left transverse drive shafts.

22. The vehicle of claim 21 wherein said input sheave of each of said gearboxes is coupled to said rotary output drive shaft by an endless flexible member.

23. In a powered vehicle including a chassis, a pair of right and left drive wheels movably supporting said chassis and an engine mounted on said chassis and having a rotary output drive shaft, a drive transmission control system mounted on said chassis for drivingly transmitting and coupling rotary drive motion produced by said rotary output drive shaft of said engine to said right and left drive wheels so as to cause forward and reverse movement of said vehicle and also to cause right and left turning movement thereof, said system comprising:

(a) a pair of right and left rotatable driven elements each coupled to and rotatable with one of said right and left drive wheels;

(b) a pair of right and left transverse drive shafts rotatably mounted independently of one another to said frame;

(c) a pair of right and left rotatable drive elements each fixed on and rotatable with a respective one of said right and left transverse drive shafts;

(d) means for independently drivingly coupling each of said rotatable drive elements with one of said respective rotatable driven elements;

(e) right and left pairs of forward and reverse drive pulleys rotatably mounted on said respective right and left transverse drive shafts and rotatable relative thereto;

(f) drive connection means for drivingly connecting said right and left pairs of forward and reverse drive pulleys with said rotary output drive shaft of said engine so as to rotatably drive said forward and reverse drive pulleys of each of the right and left pairs thereof in first and second opposite rotational directions;

(g) right and left pairs of split sheave clutches mounted to said right and left transverse drive shafts adjacent to said respective right and left pairs of drive pulleys, each of the split sheave clutches having a first part fixed on and rotatable with a respective one of said forward and reverse drive pulleys of each of said right and left pairs thereof and a second part fixed on and rotatable with a respective one of said right and left transverse drive shafts; and (h) drive direction control means movable in a first direction for frictionally engaging concurrently first ones of said split sheave clutches of said right and left pairs thereof so as to cause rotation of said right and left transverse drive shafts with said respective forward drive pulleys of said right and left pairs thereof and thereby cause rotation of said rotatable drive elements in the first rotational direction and therewith rotation of said rotatable driven elements and movement of said drive wheels in a forward direction, said drive direction control means being movable in a second direction opposite to the first direction for frictionally engaging concurrently second ones of said split sheave clutches of said right and left pairs thereof so as to cause rotation of said right and left transverse drive shafts with said respective reverse drive pulleys of said right and left pairs thereof and thereby cause rotation of said rotatable drive elements in the second rotational direction and therewith rotation of said rotatable driven elements and movement of the drive wheels in a reverse direction;

(i) wherein said drive connection means for drivingly connecting said right and left pairs of forward and reverse drive pulleys with the rotary output drive source includes an endless flexible member coupled about the rotary output drive source for undergoing movement along a continuous path, and a plurality of idler sheaves rotatably mounted on a corresponding plurality of vertical shafts mounted on said chassis and disposed between the rotary output drive source and said forward and reverse drive pulleys, said idler pulleys being aligned with the respective rotary output drive source and said forward and reverse drive pulleys so as to arrange said continuous path of movement of said endless flexible about said forward and reverse drive pulleys to cause rotation thereof in said first and second opposite rotational directions.

* * * * *